United States Patent
Seki et al.

[11] Patent Number: 5,452,202
[45] Date of Patent: Sep. 19, 1995

[54] NC DATA CREATION METHOD

[75] Inventors: Masaki Seki, Tokyo; Takashi Takegahara, Hachioji; Kazuhiko Morisaki, Kawaguchiko, all of Japan

[73] Assignee: Fanuc Ltd., Yamanashi, Japan

[21] Appl. No.: 387,353

[22] Filed: Feb. 13, 1995

Related U.S. Application Data

[63] Continuation of Ser. No. 140,141, filed as PCT/JP93/00310, Mar. 15, 1993, abandoned.

[30] Foreign Application Priority Data

Mar. 19, 1992 [JP] Japan ................... 4-062896

[51] Int. Cl.⁶ ................ G05B 19/409; G06F 19/00
[52] U.S. Cl. ................ 364/191; 318/568.1; 364/474.21; 364/474.22
[58] Field of Search ................ 364/191–193, 364/474.21, 474.22, 474.27; 318/568.1

[56] References Cited

U.S. PATENT DOCUMENTS

| | | | |
|---|---|---|---|
| 4,550,375 | 10/1985 | Sato et al. | 364/474.17 X |
| 4,636,938 | 1/1987 | Broome | 364/474.22 X |
| 4,835,700 | 5/1989 | Tanaka et al. | 364/192 X |
| 5,229,950 | 7/1993 | Niwa | 364/192 |
| 5,266,876 | 11/1993 | Ito et al. | 364/474.25 X |
| 5,289,382 | 2/1994 | Goto | 364/474.21 |

FOREIGN PATENT DOCUMENTS 3-196943  8/1991  Japan .

*Primary Examiner*—Joseph Ruggiero
*Attorney, Agent, or Firm*—Staas & Halsey

[57] ABSTRACT

An NC data creation method by which the sequence of machining definition data can be changed to the sequence required by a user. A desired output sequence of machining command data is previously created as pattern definition data by a user executing a predetermined operation. Then, machining command data is input through an input screen as an interactive type input screen. A system processing unit reads the thus input machining command data and the pattern definition data, changes the sequence of the machining command data in accordance with the pattern definition data and outputs machining definition data. Therefore, NC data having the machining definition data provided with the output sequence desired by the user can be directly created. As a result, the sequence of the machining definition data need not be changed again and the NC data can be rapidly created.

3 Claims, 4 Drawing Sheets

FIG. 3

100 MACHINING COMMAND DATA TABLE

| ITEM | IDENTIFIER | COMMAND VALUE |
|---|---|---|
| 101 — SCREEN NAME | SCR1 | |
| 102 — COOLANT | COOLANT | OFF |
| 103 — SPINDLE | SPINDLE | OFF |

FIG. 4

200 PATTERN DEFINITION FILE

```
SCR 1  {
    SPINDLE
    COOLANT
}
```
— 201

```
SCR 2  {
    ⋮
}
```
— 202

NC DATA CREATION METHOD

This application is a continuation of application No. 08/140,141, filed as PCT/JP93/00310, Mar. 15, 1993, now abandoned.

BACKGROUND OF THE INVENTION

1. Field of the Invention

The present invention relates to an NC data creation method of creating NC data in a CAD/CAM system or interactive type numerical control apparatus.

2. Description of the Related Art

Conventionally, in a CAD/CAM system or interactive type numerical control apparatus machining definition data input through an interactive type input screen is output in the sequence of inputting the data therethrough to create NC data. In particular, even if the sequence of the machining definition data is desired to be changed, the sequence is fixed by the system program of the CAD/CAM system and the like.

Since the sequence of the machining definition data is not always fixed to respective machine tools, however, the sequence of the machining definition data must be changed in the NC data created by a conventional CAD/CAM system, and thus the creation of the NC data is a time consuming job. Further, a problem arises in that the change of the sequence of the machining definition data is forgotten or the operation for changing the sequence is erroneously executed and faulty NC data is created.

SUMMARY OF THE INVENTION

Taking the above into consideration, an object of the present invention is to provide an NC data creation method by which the sequence of machining definition data can be changed to the sequence required by a user.

To attain the above object, according to the present invention, there is provided an NC data creation method of creating NC data in a CAD/CAM system or interactive type numerical control apparatus, which comprises the steps of temporarily storing machining command data input from an input screen, reading pattern definition data corresponding to the input screen from a pattern definition file, and changing the sequence of the machining command data in accordance with the pattern definition data to output machining definition data to thereby create said NC data.

First, the machining command data input from the input screen is temporarily stored. Next, the pattern definition data corresponding to the input screen is read from the pattern definition file. Then, the sequence of the machining command data is changed in accordance with the read pattern definition data to output machining definition data to thereby create NC data.

BRIEF DESCRIPTION OF THE DRAWINGS

FIG. 3 is a diagram showing an example of the data structure of a machining command data table;

FIG. 4 is a diagram showing an example of the data structure of a pattern definition file.

DETAILED DESCRIPTION OF THE PREFERRED EMBODIMENTS

An embodiment of the present invention will be described below with reference to the drawings.

Figure 2:
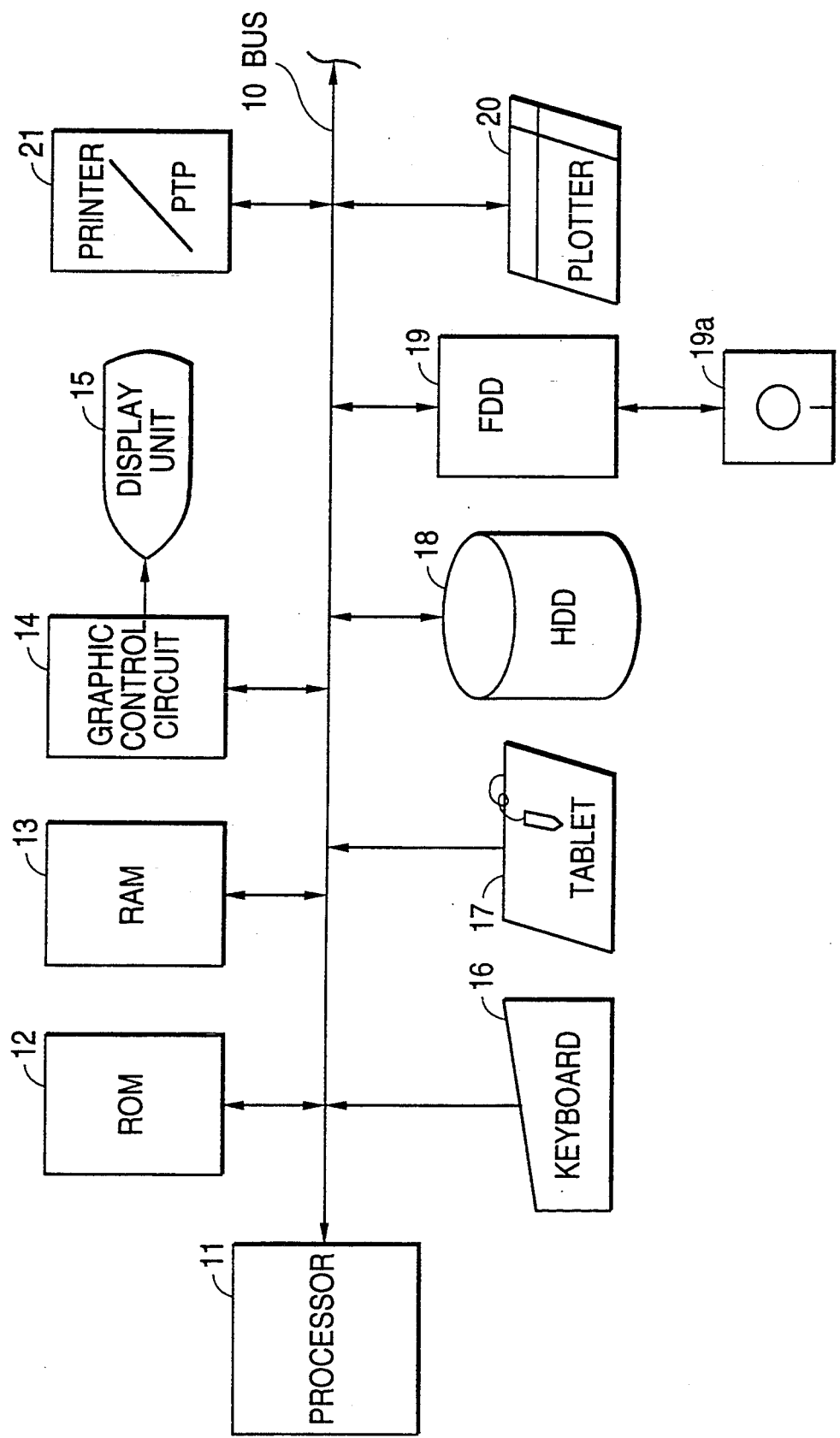
FIG. 2 is a block diagram of the hardware of a CAD/CAM system.

FIG. 2 is a block diagram of the hardware of a CAD/CAM system embodying the present invention. A processor 11 controls the CAD/CAM system as a whole in accordance with the system program stored in a ROM 12. The ROM 12 stores data of interactive screens and the like in addition to the system program for controlling the CAD/CAM system as a whole. A RAM 13 stores various data such as a machining command data table, programs loaded from a floppy disk 19a, machining configuration data for creating drawings and NC data, and the like.

A graphic control circuit 14 converts data such as NC data, the configurations of workpieces and the like stored in the RAM 13 into signals for display and supplies these signals to a display unit 15. The display unit 15 displays the NC data, the configurations of the workpieces and the like. A CRT, liquid crystal display unit or the like is used as the display unit 15.

A keyboard 16 includes operation keys used for data input and software keys the function of which is changed by the system program and the like. A tablet 17 is used to input data such as configuration information including figure data.

A hard disk drive (HDD) 18 stores data such as a system information including parameters and the like, NC data and the like which must be maintained operative even after a power supply to the CAD/CAM system is cut off. A floppy disk drive (FDD) 19 can drive the floppy disk 19a to input the NC data thereto or enable corrected NC data to be output to the floppy disk 19a.

Further, machining configurations and NC data created also may be output to a plotter 20 and printer/paper tape puncher (PTP) 21. Note, these components are interconnected through a bus 10.

Figure 1:
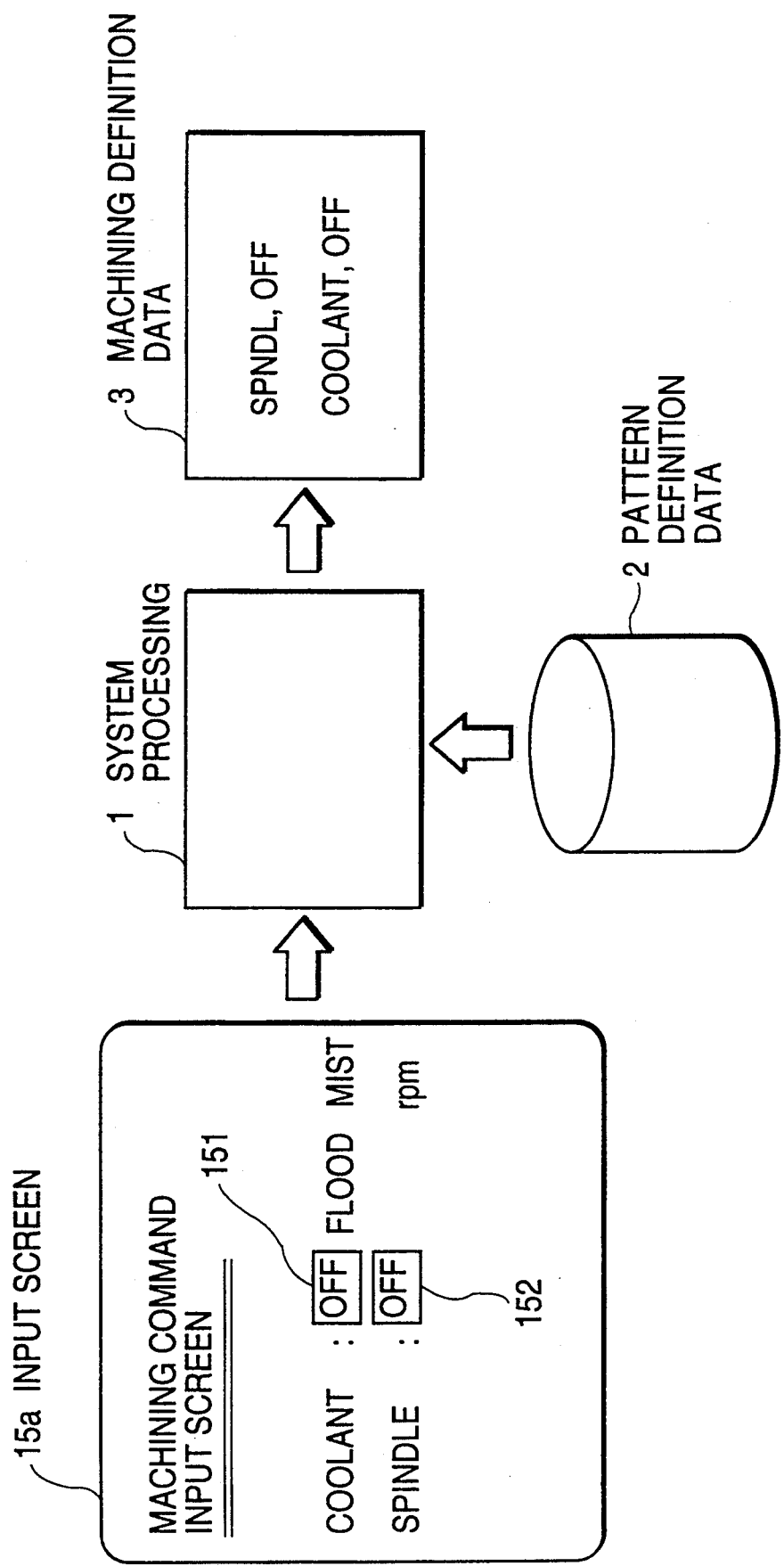
FIG. 1 is a diagram explaining the principle of an NC data creation method according to the present invention.

FIG. 1 is a diagram explaining the principle of the NC data creation method according to the present invention, In FIG. 1, a system processing 1 reads machining command data input at an input screen 15a and pattern definition data 2 and changes the sequence of the machining command data in accordance with the pattern definition data 2 and outputs machining definition data 3.

The input screen 15a is displayed on the display unit 15 of FIG. 2 to display a machining command input screen for inputting a machining command. A command information such as, for example, a coolant, spindle and the like is displayed on the machining command input screen to control a machine tool and the like. A user can interactively specify the content of the command information by moving cursors 151, 152 through the keyboard 16 and the like shown in FIG. 2. FIG. 1 shows that the coolant and spindle are specified as "OFF". Thereafter, the interactively specified input screen name, command information and the like are temporarily stored in the RAM 13 of FIG. 2 as a "machining command data table" in a predetermined format as described below.

The pattern definition data 2 is created by the user previously effecting a predetermined operation and a desired output sequence of the machining command data is set to a pattern definition file to be described later in a predetermined format. The pattern definition file is stored in the HDD 18 or the floppy disk 19a of FIG. 2.

The system processing 1 is a function realized by the processor 11 executing the system program stored in the ROM 12 of FIG. 2. The system processing 1 first reads the pattern definition data 2 set to the pattern definition file stored in any one of the HDD 18 or floppy disk 19a.

Next, machining definition data 3 is output in accordance with the output sequence of the machining command data set to the pattern definition data 2 with reference to the machining command data table stored in the RAM 13. Specifically, the character trains corresponding to the input screen name and output item set to the pattern definition data 2 are verified with the identifiers defined in the machining command data table, Then, the machining definition data 3 is output with respect to the agreed output items based on the command values registered to the machining command data table.

Thereafter, the machining definition data 3 is converted into a data format inherent in an NC function by a post processor and output as the NC data. Thus, the NC data can be created by outputting the machining definition data 3 having the sequence desired by the user.

Next, the data structure of the machining command data table and pattern definition file will be described.

FIG. 3 is a diagram showing an example of the data structure of the machining command data table. The machining command data table 100 is created when the machining command data is temporarily stored in the RAM 13 and composed of an item, identifier and command value. Note, the machining command data table 100 is created for each input screen in correspondence with the interactive type input screens.

The "item" on the left column of the machining command data table 100 includes an input screen name indicated on a line 101, a coolant indicated on a line 102 and a spindle indicated on a line 103. In the same way, the "identifier" shown in a central column includes character trains corresponding to the "item" and previously defined by the system. Further, command values such as numerical values and the like interactively specified by the user are registered to the "command value" on the left column in correspondence with the "item".

FIG. 4 is a diagram showing an example of the data structure of the pattern definition file. The pattern definition file 200 is created by the user executing a predetermined operation. Further, the pattern definition file 200 is composed of a plurality of pattern definition data 201, 202, . . . set in correspondence with the interactive type input screens.

Each of the plurality of the pattern definition data 201, 202, . . . is composed of an input screen name and output item. The input screen name is set in front of the left brace "{" of each pattern definition data and the output item is set between the left brace "{" and a right brace "}" by a character train for each line. Note, the input screen name and output item must be set by the same characters as those of the identifier defined by the machining command data table 100 in FIG. 3. Therefore, when a character train different from the identifier defined in the machining command data table 100 is set, the character train is not normally recognized and thus a desired machining definition data cannot be output. FIG. 4 shows that "scrl" is set as the input screen name and "spindle" and "coolant" are set as the output item in the pattern definition data 201.

Figure 5:
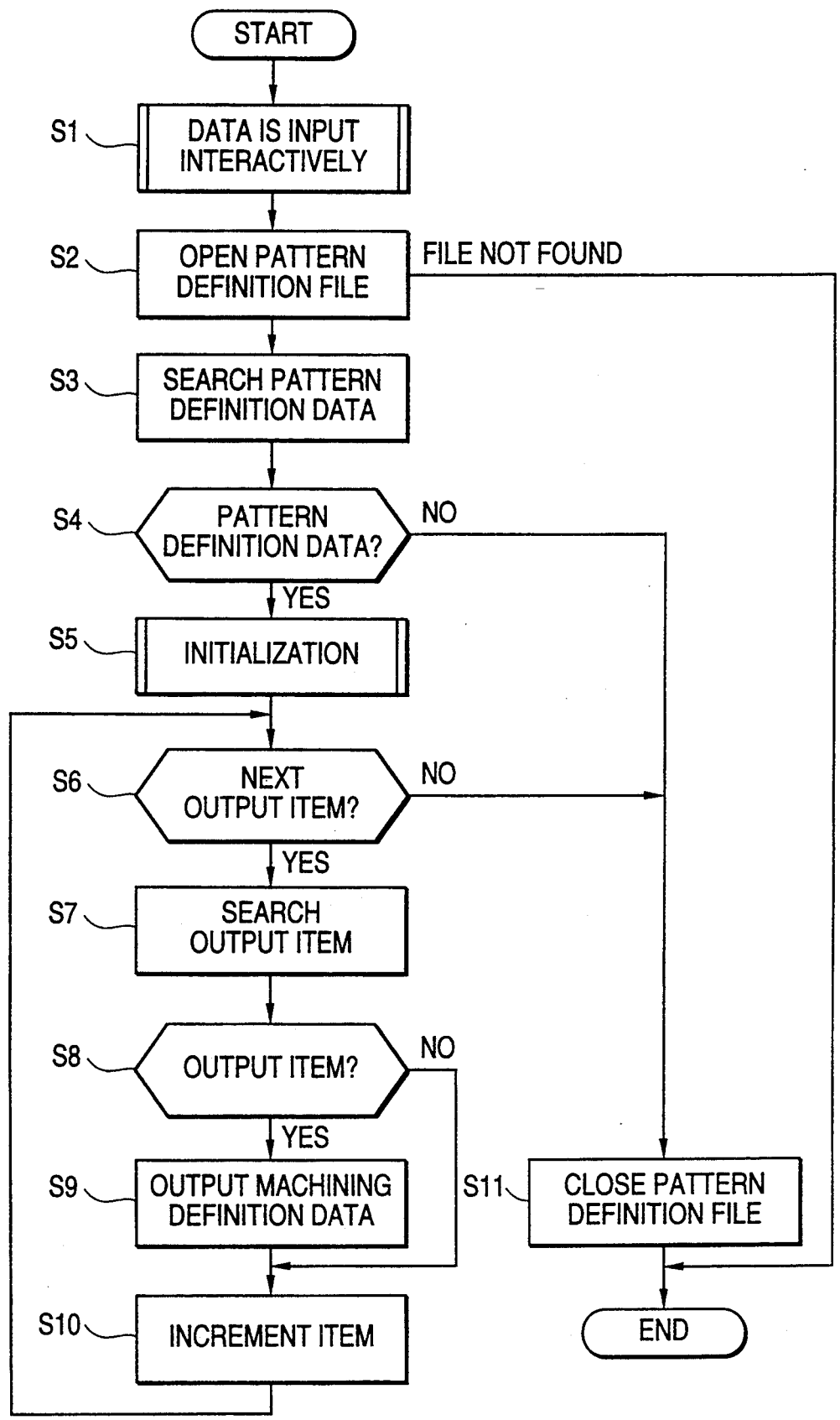
FIG. 5 is a flowchart showing the processing procedure of the NC data creation method of the present invention.

FIG. 5 is a flowchart showing the processing procedure of the NC data creation method of the present invention. This flowchart is a processing procedure realized by the processor 11 executing the system program stored in the ROM 12 of FIG. 2. Note, numerals prefixed with an "S" indicate the numbers of steps of the procedure.

[S1] Data is interactively input. That is, a predetermined command information is interactively specified in accordance with a machine tool to be used by the user. After the specification, the system creates the machining command data table 100 shown in FIG. 3.

[S2] The pattern definition file 200 is opened. If the pattern definition file 200 is not found, this processing procedure is ended.

[S3] The pattern definition data is searched. Specifically, for example, the "scrl" in the identifier set to the central column on the line 101 of the machining command data table 100 is searched from the input screen name set to each pattern definition data in the pattern definition file 200 of FIG. 4.

[S4] It is determined whether or not there is the pattern definition data searched at step S3. That is, it is determined whether or not there is an input screen name in the pattern definition file 200, the input screen name corresponding to the data input executed through the interactive type screen at step S1. If there is the pattern definition data corresponding to the input screen name (YES), the flow goes to step S5 and if not (NO), the flow goes to step S11.

[S5] An initialization processing is executed. Specifically, the output items in the pattern definition data searched at step S3 are read. Further, a pointer is initialized so that the initial output item is specified in the thus read output items.

[S6] It is determined whether or not there is a next output item. That is, it is determined whether or not there is an output item specified by the pointer. If there is the output item specified by the pointer (YES), the flow goes to step S7, and if not (NO), the flow goes to step S11.

[S7] The output item is searched. Specifically, the character train of the output item specified by the pointer is searched from the identifier shown in the central column of the machining command data table 100.

[S8] It is determined whether or not there is the output item. If there is the output item as the identifier (YES), the flow goes to step S9, and if not (NO), the flow goes to step S10.

[S9] The machining definition data 3 corresponding to the output item is output.

[S10] The output item is incremented. That is, the pointer goes to a next output item from the currently specified output item. For example, when the "spindle" in the pattern definition data 201 of the pattern definition file 200 is specified by the pointer as the currently specified output item, the "coolant" as the next output item is specified by the pointer next.

[S11] The pattern definition file 200 is closed.

Therefore, since the output sequence of the machining definition data is changed to the output sequence required by the user based on the output items set to the pattern definition data 201, 202, . . . of the pattern definition file 200, NC data having the sequence of the machining definition data desired by the user can be directly created. As a result, there is no need for changing the sequence of the machining definition data again and thus the NC data can be rapidly created.

Although the present invention is applied to the CAD/CAM system in the above description, it can be also applied to an interactive type numerical control apparatus in the same way.

Further, although the machining definition data 3 is output in the sequence of the output items set to the pattern definition file 200 in the present invention, the machining definition data may be output from the command information nearer to the upper portion of a displayed input screen by changing the sequence of each item of the command information itself displayed on the interactive type input screen.

Further, although the character train is used as the identifiers shown in the central column of the machining command data table 100 and the output items set to the pattern definition file 200, any arbitrary data such as a numerical value for specifying the items may be used.

Then, although the output item which is set to the pattern definition file 200 and not defined as the identifier of the machining command data table 100 is not output, the machining definition data not output may be output when necessary.

Further, although the command information is specified in the interactive type input screen by moving the cursors 151, 152 through the keyboard 16 and the like shown in FIG. 2, it may be specified by the pointing device such as the tablet 17, a mouse or the like through a command key referred to as an "icon".

As described above, according to the present invention, since a user can change the output sequence of the machining definition data by the provision of the pattern definition file for setting the pattern definition data indicating the output sequence of the machining definition data, NC data having the output sequence of the machining definition data desired by the user can be directly created. As a result, the sequence of the machining definition data need not be changed again, and thus the NC data can be rapidly created.

Further, since there is no chance in which the change of the sequence of the machining definition data is forgotten or the operation for changing the sequence is erroneously executed, the creation of faulty NC data is prevented.

We claim:

1. An NC data creation method of creating NC data in a CAD/CAM system or interactive type numerical control device, comprising the steps of:

a user inputting machining command data from a display screen, said machining command data indicating operations to be performed by respective elements in said numerical control apparatus;.

storing said inputted machining command data;

said user creating pattern definition data, said pattern definition data indicating a desired output sequence of said machining command data;

storing said created pattern definition data in a pattern definition file;

reading said stored pattern definition data from said pattern definition file; and changing a sequence of said machining command data based on said read pattern definition data to output machining definition data used to create said NC data.

2. An NC data creation method according to claim 1, wherein said machining command data includes at least an item and identifier command value.

3. An NC data creation method according to claim 1, wherein said pattern definition data includes at least an input screen name and output item.

* * * * *